Patented Sept. 15, 1925.

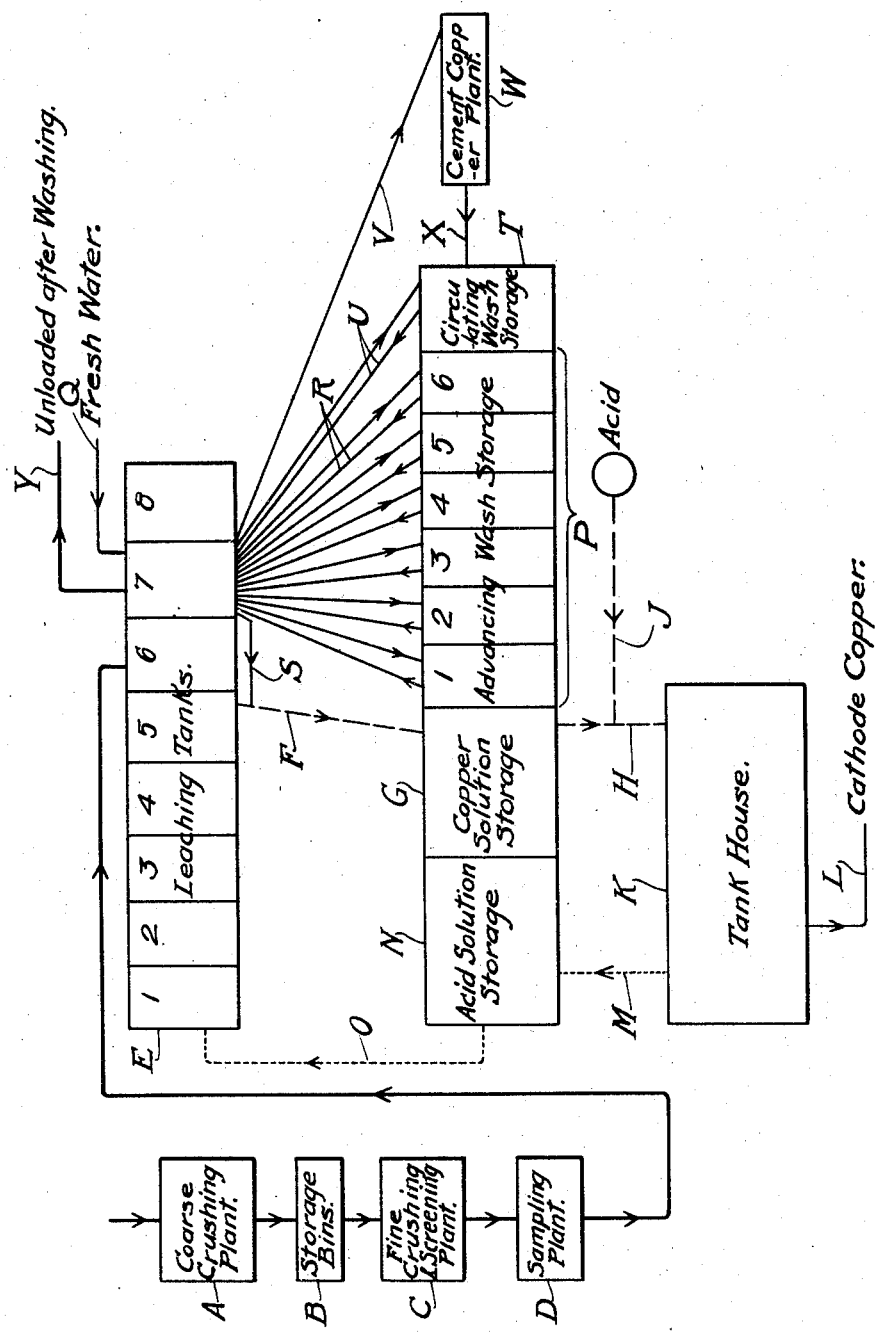

1,553,416

UNITED STATES PATENT OFFICE.

GEORGE D. VAN ARSDALE, OF LOS ANGELES, CALIFORNIA, ASSIGNOR TO INSPIRATION CONSOLIDATED COPPER COMPANY, OF NEW YORK, N. Y., A CORPORATION OF MAINE.

COMBINATION PROCESS.

Application filed September 28, 1923. Serial No. 665,463.

*To all whom it may concern:*

Be it known that I, GEORGE D. VAN ARSDALE, a citizen of the United States, residing at Los Angeles, in the county of Los Angeles and State of California, have invented new and useful Improvements in a Combination Process, of which the following is a specification.

My present invention relates to a process of recovering values from ores and other materials which is especially applicable to copper-bearing materials and in which certain recently discovered methods of leaching and electrodeposition, as set forth in my application covering a method of leaching sulfid and mixed ores, Serial No. 639,969, filed May 18, 1923, may be advantageously combined in a comprehensive procedure comprising also, as one of its essentials, a new method of recovering residual values by a countercurrent washing followed by an exhaustive washing involving a precipitation, this novel method of washing being described and claimed in a joint application by Harold W. Aldrich, Walter S. Scott and myself, Serial No. 661,531 filed September 7, 1923.

My present combination process is especially designed to render commercially available certain large bodies of ore for the treatment of which no commercially profitable method is known to have been heretofore developed; and this combination process may optionally be employed also in connection with the novel method of treating concentrates by steps comprising a deferred roasting, or entirely omitting roasting, as set forth in my copending application Serial No. 639,968, also filed May 18, 1923.

My present invention is directed especially to the treatment of that class of copper ores known as mixed ores, or of so called oxidized ores, but other materials such as ores or concentrates containing copper wholly or partly in sulfid form may be treated, various alternative steps being hereinafter suggested as applicable according to the conditions encountered. It may be further stated by way of general introduction that this process aims to so utilize and coordinate the essential features of the mentioned novel washing method with the essential features of a cyclical method involving a leaching and an electrodeposition that both a solution of copper salts obtained by a countercurrent washing and a copper bearing precipitate obtained by an exhaustive washing involving cementation of copper shall effectively supplement and combine with rich liquors from which total copper may be recovered by electrolysis; and, in one embodiment of my invention which is especially suitable to cyclical processes employing an iron salt as a solvent of copper values, the mentioned exhaustive washing may be so executed as to yield, incidentally to the very complete recovery of copper by the novel washing system, a solution containing iron salt suitable for use in maintaining the ferric content of a leaching agent cyclically regenerated during an electrodeposition,—both the leaching and the electrodeposition being optionally conducted, under a novel technique described in my application first above mentioned and also described herein, in the presence of ferric iron in such quantities as may be found most favorable to a maximum efficiency in leaching.

As a concrete example of the application of my discoveries in a process of treating mixed copper ores, I may refer, as in my prior application, to the treatment of a body of dry crushed ore adapted to pass through a one-third or a one-fourth inch mesh. Suitable crushing is highly important to the best success in the application of my process to materials containing copper in sulfid form, as it may contribute not only to a completeness of recovery but may also obviate the necessity for an application of heat during leaching, or it may materially shorten the period of treatment.

Broadly, the process to which I subject successive bodies of such dry crushed ores or other copper bearing materials preferably involves a percolation method of extraction so associated with a novel method of washing and a method of electrodeposition that the latter may yield metallic copper, and may yield also, as an incidental product, an acid solution of ferric sulfate suitable for use, with or without addition of acid, and with or without the addition of iron salts obtained during the mentioned washing, in the extraction of a further quantity of crushed ore, or the like, my process being in this sense cyclical, and the practicability of this procedure depending in part upon the limit of tolerance of an iron sulfate present during electrolysis and during extraction.

When values are to be recovered from mixed ores of the specific character just referred to, or from certain types of concentrates containing copper in sulfid form, I may subject a body of suitably subdivided material, without roasting, to treatment in an aqueous solvent containing, in addition to about 5% sulfuric acid, more or less, depending on the character of the ore, about 0.5% to 1.5% of iron in the form of ferric sulfate and copper in the form of copper sulfate, which may be present in quantities from about 2.5% to about 4.5%.

The reactions and methods by which the oxid constituents are dissolved, as above indicated, do not materially differ from known acid leaching practice on these constituents; but it had not been considered practicable, prior to the discovery set forth in my application first above mentioned, to remove both oxid and sulfid compounds by one leaching operation.

It had been known that sulfid compounds of copper are amenable to the solvent action of ferric salts under certain conditions. The following equation is an example of such action, in the presence of free acid sufficient to prevent precipitation of compounds of iron:

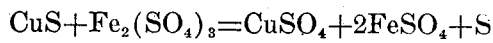

$$CuS + Fe_2(SO_4)_3 = CuSO_4 + 2FeSO_4 + S$$

It had also been known that the solution produced by the above equation may be treated by electrolysis so as to regenerate the solvent. There had, however, been other obstacles, unrelated to the above mentioned discovery of the necessity for fine crushing, in the way of a practical application of the above simple method of leaching sulfur compounds with ferric iron and subsequently regenerating the solvent. Up to the time of my mentioned discovery, electrolysis of copper sulfate solutions carrying iron had not been found practicable, without a diaphragm cell, when the strength of ferric iron incidentally produced during electrolysis rose above a figure in the neighborhood of 0.3% to 0.5%.

But, as I have pointed out in my mentioned application, solutions carrying only 0.3% to 0.5% ferric iron are comparatively inactive on some sulfide compounds of copper; and, on others, the action is slow and success may depend upon heating. With solutions containing higher amounts of ferric iron, say from 0.5% to 1.5%, I discovered that the solvent action is much more active and rapid; so that, on some ores and concentrates, the necessity for any warming of the solutions is obviated,—with very substantial economic advantages. It will be understood from the foregoing that, in the employment of ferric sulfate leaching solutions, starting with, say 1% or more of ferric iron, complete reduction of ferric iron during such leaching and before electrolysis cannot be economical, from the standpoint of leaching efficiency,—although this complete reduction had, prior to my mentioned discovery, been regarded as essential to good electrolytic practice.

In addition to the discovery just referred to, my first above mentioned application sets forth also the important complementary discovery that, by modifying electrolytic conditions, electrolysis can be carried on, with commercial yields of copper, in the presence of very much higher amounts of ferric iron than have heretofore been thought permissible, and even in the presence of an amount sufficiently high to constitute an active solvent percentage of ferric iron. I have therefore proposed to use conjointly, and have recently used with marked success, my respective discoveries that such solutions are highly active solvents and that it is practicable to make them by electrolysis; and, to do this, I prefer to leach the ore in such manner as not to obtain a substantially complete reduction of the ferric iron present, aiming rather to so proportion ore or concentrate and solvent that a good extraction shall take place during a period within which the percentage of ferric iron present in the solvent or leach liquor is still high enough to act vigorously. This point will, of course, vary with different materials and conditions; but, in general, I have found it not necessary to reduce ferric iron below about 0.2%, and, in some cases, not below 0.5%. Generally speaking, on most ores, a maximum strength of 1% of ferric iron is sufficient for high leaching efficiency; but higher percentages may be used, if necessary; and a preferred method by which such percentages of ferric iron may be made by electrolysis, as set forth in my mentioned application, is also referred to subsequently herein.

The duration of the percolation treatment of a given body of ore, to obtain therefrom a rich liquor suitable for electrolysis, will vary with the character of the ore and may be from four to twelve days. The use of the described relative content of ferric iron in the leach liquor makes possible the indicated reliance upon a comparatively short period of extraction, and may obviate the necessity for an application of heat, even during the final period of extraction. As is now customary in operations of this character, the countercurrent principle is preferably employed throughout the leaching; and, whenever such a course shall be indicated by a comparison of the copper content of the ore with the assay of a regenerated solvent resulting from electrolysis, as hereinafter described, suitable additions of acid or of a solution containing iron salts obtained as hereinafter mentioned may be made to the leach liquor; but otherwise it is of importance that the volume of successive portions of leach liquor be so controlled as not materially to change the total volume of solution. This can be done by well known methods provided there is no excess or deficiency of solution constituents. In case the cyclical treatment of successive charges of ore causes an undue accumulation or building up of any metal, a solution discard for special treatment may be required, or other described methods of readjustment may be employed; but, in any event, the invention to which the present application is directed must be regarded as involving a completion of recovery by the newly discovered washing method involving both a countercurrent washing and a circulation or exhaustive washing in the general manner set forth in the joint application above mentioned.

For example, in washing by percolation, a number of successive washes are applied, each of which removes a fraction of the remaining copper. Assuming that it is desirable to have the volume of the respective washings so adjusted that the total volume of solution remains practically a constant, the unit volume of wash water may be adjusted to be approximately equal to the volume of liquid finally discharged, as residual moisture, in the tailings, allowance being made for such moisture as comes into the system with the ore, and for evaporation during the cycle of operations. When the total volume of solution is controlled in the manner just referred to, the strongest wash water being finally added to the main body of rich liquor obtained by leaching, the subsequent washes are successively advanced, during following cycles. It is not practicable to carry more than a limited number of stock washes, and even when six or eight washes are employed, the last wash may carry from 0.15% to 0.25% or more of copper. Discharge of tailings carrying residual moisture with such percentages of copper results in appreciable losses. The above mentioned joint application accordingly makes use of the fact that it is often perfectly practicable and economical to precipitate copper, for example by cementation, from solutions carrying much less than the above mentioned percentages, the economy of such a precipitation being due to the facts that pumping costs are ordinarily comparatively low and that cementation costs are per-pound costs. There thus arises an especial advantage in the employment of the exhaustive method of washing, involving cementation, as a supplemental procedure following the employment of a countercurrent method. In connection with the new system of washing just referred to and described and claimed in the mentioned joint application, it is pointed out that the novel method of washing here referred to may obviously be applied in conjunction with various methods of leaching ores, or the like, for example agitation methods of leaching; but it should also be appreciated that there are special additional advantages in so employing this novel washing method that it shall economically contribute (1) to a completeness of copper recovery by providing both a wash liquid and a precipitate suitable for addition to the rich liquors and also (2) to the replenishment of the iron salts required in the leach liquors, in the manner herein described.

As applied in connection with a leaching of copper bearing materials by percolation, my novel combined process may be further illustrated as follows:

Batches of approximately forty tons of mixed ore assaying about 1.5% total copper (of which, for example, 0.88% may be acid soluble and 0.62% may be in sulfid form) have been crushed to about one-third inch mesh and distributed to a depth of approximately fifteen feet in the bottom of substantially rectangular concrete tanks, within which they have been treated by a countercurrent percolation method of the character above referred to for a contact period of approximately ten days, employing an acid ferric sulfate liquor carrying between 1.00% and 1.5% of ferric iron initially, and about 5% free sulfuric acid, and about 2.75% of copper as sulfate. This mentioned treatment by percolation was then followed by a draining of the ore and by a washing on the countercurrent principle in the manner outlined above, about forty gallons of water per ton of ore being employed as a unit volume of wash liquor, and five or six similar unit volumes of wash liquor being successively applied to a batch of ore, and each first or strongest wash liquor being finally added to the rich liquor for electrolytic treatment, and the others advanced for subsequent washing as hereinafter described. After the draining of the last unit volume of wash liquor from the ore, water, in any quantity suitable to convenient manipulation, was pumped onto the ore. The water took up a part of the remaining dissolved values and was then removed from the leaching or other tank and passed through an iron launder system for precipitation of copper with simultaneous production of a solution containing iron salts, and then returned to the ore, these operations being repeated by a circulation of the wash until a satisfactorily complete or exhaustive extraction was obtained, as indicated by the following typical assay of the tailings, for copper, after a total period of treatment amounting to approximately fourteen days including charging, leaching as described, countercurrent washing and exhaustive washing as described, and discharging: Total copper 0.159%, including soluble copper 0.005% (all of this .005% being water soluble) and sulfid copper 0.154%. In the case of the materials referred to, this was equivalent to extraction percentages as follows:

|  | Per cent. |
|---|---|
| Total copper | 89.4 |
| Soluble copper | 99.2 |
| Sulfid copper | 75.1 |

As will be understood, the described procedure yields not only, by the countercurrent washing, wash liquor finally suitable to be added to the rich liquor and a precipitate of cement copper also suitable to be added thereto, for a final recovery of total copper by electrolysis or other desired means, but also the mentioned solution of iron salts resulting from the cementation; and it will be understood that any suitable quantity of the circulating wash liquor used in the mentioned exhaustive washing may at any time be added to the leach liquors, as may be indicated by the assay of the respective liquids referred to, the conservation of iron salts here referred to being optionally supplemented by a final washing of tailings with water to effect a further removal therefrom of iron salts introduced or augmented therein by the described exhaustive washing.

Before outlining the technique by which I prefer to obtain copper values from my rich liquors, I now refer to certain variations of procedure by which my combination process above outlined may be best adapted to the utilization of certain specific copper bearing materials. It being well known that a preliminary roasting is advantageous in the case of many ores, I mention at this point my recent discoveries regarding an alternative treatment of concentrates, as set forth in my patent application Serial No. 639,698, filed May 18, 1923, in which I have pointed out that, although an initial roasting of certain concentrates, which may contain, for example, bornite, or chalcocite, or chalcopyrite, may yield a calcine whose extraction is very incomplete, the employment of an initial leaching, followed by what I have termed a deferred roasting, may yield, with the same material, a calcine from which a nearly complete extraction is possible.

When use is made of a preliminary leaching followed by a deferred roasting and a subsequent leaching, successive portions or unit quantities of the respective leach liquors may be employed upon the countercurrent principle, as outlined above, and an application of heat, especially toward the end of the extraction, may be sometimes economically justified, the necessity for heat depending both upon the percentage of ferric iron present and upon the solubility of the particular compounds present—chalcopyrite, for example, requiring more elevation of temperature than does chalcocite, and this initial extraction, either with or without an application of heat, being often insufficient for a satisfactorily complete recovery of values. The residue being then separated, by filtration or otherwise, from the leach liquor, I may roast this residue without risk of the detrimental effect referred to above, the leached concentrates being thereby brought largely into an oxidized condition favorable to a very complete extraction, the resulting filtrates being optionally combined with those first obtained, and all washings, following this second extraction, being executed in the novel manner above set forth in detail, the total and augmented quantity of rich liquor being finally subjected to an electrolysis or to other treatment adapted to the production of either metallic copper or a desired compound thereof, but preferably to an electrolysis especially suitable to a maximum efficiency of extraction in the combination and cyclical process upon which protection is herein sought.

Although what I have above described as a deferred roasting is often distinctly more advantageous than an initial roasting and may be employed for leaching concentrates, it is of the highest technical and practical interest that, in the case of certain ores carrying sulfid copper, I find it possible and economically advantageous actually to dispense with all roasting, a suitable recovery being obtainable without this expensive step. It will be obvious that, whenever liquors representing a good recovery and suitable for use in my novel dissolving and washing and electrolytic process are obtainable by a mere cold extraction (or by a cold extraction followed by a warm extraction,— depending on the nature of the sulfids present) this last mentioned variation of my process, favorable to a working of extensive bodies of ore that have been regarded as practically valueless, may be of the very greatest economic importance.

Both the copper-containing precipitate which is obtained by cementation and the washings obtained by the counter-current method referred to being combined, at any suitable intervals, with the rich liquors obtained as described above, one very important practical feature common to my invention described in the prior application first above mentioned and the present application is the method of electrolysis by which I may produce or regenerate larger amounts of ferric iron than have hitherto been thought possible at any reasonable cathode efficiency. Contrary to the prevalent opinion, I have found, as set forth in my mentioned application, that commercial yields of copper per kilowatt hour may be had with solutions beginning at about a zero content of ferric iron and ending considerably above 1%, 1.5% being possible in some cases. That is to say, within the mentioned limits, the actual percentage of ferric iron may be disregarded in electrolysis,—although, obviously, the cathode efficiency, for a given amount of copper deposit, will vary with the point at which ferric iron starts in beginning electrolysis. In order, therefore, to maintain any constant deposition efficiency, the amount of copper deposited per tank room cycle must vary inversely with the average percentage of ferric iron before and after electrolysis. In operating with a comparatively high average of ferric iron, therefore, the solutions have to be returned more frequently, in order to leach the copper from any given quantity of ore. This is done at an expense of pumping cost; but may nevertheless be entirely justified in view of the fact that, as stated, high ferric iron is very desirable from the standpoint of leaching efficiency.

In order to obtain commercial cathode efficiency during electrodeposition of copper, I have found it necessary to employ a current density of at least seven to eight amperes per square foot, and the current density may be raised to fifteen amperes or more per square foot; and I have found that, by suitably proportioning current density to ferric iron, the latter may be disregarded. To obtain commercially profitable yields, as measured in terms of pounds of copper per kilowatt hour, it is also important that low voltages be obtained; and a suitable lowering of voltages by an increase in conductivity may be obtained by a moderate heating (say, to 110° F.) in connection with which it is necessary to employ known means of depolarization, and it may be necessary to employ as many graphite anodes as may be suitable to a desired ratio of conversion of iron salts into the ferric form, as described in my copending application 639,970, also filed May 18, 1923, but to which the present application may be regarded as not necessarily related.

All of the alternative procedures to the protection of which my present application is directed will be understood to involve a novel washing method employed subsequently to a leaching and previously to a final recovery of copper by a process in which a leach liquor may be regenerated, the limiting case, as to washing methods, being that in which a circulating or exhaustive wash, involving a precipitation of copper, may constitute practically the only method of washing relied on; and this limiting case should be regarded as falling distinctly within the scope of my present invention whenever the mentioned precipitate containing copper is added to a rich liquor for recovery of "total" copper by my novel method of electrodeposition, or whenever a liquid containing iron salts obtained by cementation is added to a leach liquor for further use. The accompanying drawing is a flow sheet of the process. The ore passes from the mine to the coarse crushing plant A thence to storage bins B and to the fine crushing and screening plant C and finally to the sampling plant D whence it passes to the leaching tanks indicated as a whole at E and numbered in succession 1, 2, 3, 4, 5, 6, 7 and 8. In the actual operation, six of these tanks are used at any one time, five for leaching, passing the solution through them in succession, one for washing and one for loading. At the stage illustrated a fresh batch of ore is being loaded into the tank 6, numbers 1 to 5 being used for the leaching operation. The rich liquor passes from tank No. 5 by the line F to the copper solution storage tank G, thence my the line H to the tank house K where the electrolytic operation is performed and the cathode copper is removed by the line L. The regenerated acid solution from the tank house K passes by the line M to an acid solution storage tank N and thence by the line O to the first of the leaching tanks in use. Additional acid is supplied from a suitable reservoir by the line J leading into the line H.

There are six tanks for the storage of the advancing wash water indicated as a whole at P and numbered in succession from 1 to 6. Fresh water comes into the leaching tank 7 containing the residual ore after leaching, by way of the line Q. The wash water circulates in turn between the tank 7 and the wash storage tank 6 by way of lines R; thence between leaching tank 7 and wash storage tank 5; thence between leaching tank 7 and wash storage tank 4; and so forth, to the end until it is at a maximum practicable richness; whereupon it is passed by the line S into the line F containing the copper solution to be treated electrolytically. The flow of the advancing wash storage is then stopped and the material in the tank 7 is treated to the circulating wash storage. The water circulates through the tank 7 and the circulating wash storage tank T by way of the lines U, a portion being taken off continuously by way of the line V to the cement copper plant W and passing thence by the line X back into the circulating body of wash water. When the maximum extraction has been obtained in this way, the tailings are removed by the line Y.

During the above operation it is understood that the leaching tank 8 is full of leached residues. The washing process is then shifted to this tank 8, the loading operation to the tank 7, the leaching operation to tanks 2 to 6 in succession, while tank 1 is left idle. It will also be understood that, both the familiar and the original component features of my combination process being capable of numerous independent uses, a great many variations or modifications of my preferred procedure, additional to those herein suggested, will fall clearly within the scope of the present invention, as the same is outlined above and in the appended claims.

What I claim is:

1. In the recovery of copper, the steps which comprise leaching ores by means of a liquor containing iron salts, washing the leached residues by a countercurrent method, thereafter washing the same residues by an exhaustive or circulation method yielding iron salts, and employing the resultant liquid in the preparation of additional quantities of leach liquor.

2. In the recovery of copper, the steps which comprise leaching ores by means of a liquor containing iron salts, washing the leached residues by a countercurrent method, thereafter washing the same residues by an exhaustive or circulation method yielding iron salts, and employing the resultant liquid in the preparation of additional quantities of leach liquor and finally recovering total copper by an electrodeposition.

3. In the recovery of copper from materials containing the same in sulfid form by a cyclical process involving an extraction which tends to convert ferric iron into ferrous iron and an electrodeposition which tends to convert ferrous iron into ferric iron, the procedure which comprises washing leached residues by a countercurrent method followed by an exhaustive method and maintaining the ferric iron throughout both said leaching and said electrodeposition at a level determined by the efficiency of extraction, up to 1% or more of ferric iron being tolerated during the electrodeposition of copper, and said electrodeposition being conducted under conditions of current density permitting the percentage of ferric iron present to be disregarded.

4. In the recovery of values from materials containing copper, the procedure which comprises an original leaching followed by a roasting and a subsequent leaching of said materials in a leach liquor containing iron salts, to obtain a rich liquor, washing the leached residues by the use of a countercurrent method followed by an exhaustive method yielding a precipitate containing copper and a solution of iron salts, and utilizing a portion of the mentioned solution of iron salts in the leaching of additional quantities of materials.

5. In the recovery of values from materials containing copper, the procedure which comprises an original leaching followed by a roasting and a subsequent leaching of said materials in a leach liquor containing iron salts, to obtain a rich liquor, washing the leached residues by the use of a countercurrent method followed by an exhaustive method yielding a precipitate containing copper and a solution of iron salts, and utilizing a portion of the mentioned solution of iron salts in the leaching of additional quantities of materials, wash waters being added to rich liquors for joint treatment by electrolysis.

6. In the recovery of values from materials containing copper, the procedure which comprises an original leaching followed by a roasting and a subsequent leaching of said materials in a leach liquor containing iron salts, to obtain a rich liquor, washing the leached residues by the use of a countercurrent method followed by an exhaustive method yielding a precipitate containing copper and a solution of iron salts, and utilizing a portion of the mentioned solution of iron salts in the leaching of additional quanties of materials, wash waters being added to rich liquors for joint treatment by electrolysis, the mentioned precipitate being added to the rich liquors for recovery of total copper therefrom.

7. In the recovery of copper values, the method which comprises circulating a wash liquid through a body of leached material and precipitating copper from said liquid by cementation, repeatedly returning said wash liquid until the removal of copper values shall have been carried to a desired degree of completeness, and adding the copper precipitated by cementation to a rich liquor.

8. In the recovery of copper values, the method which comprises circulating a wash liquid through a body of leached material and precipitating copper from said liquid by cementation, repeatedly returning said wash liquid until the removal of copper values shall have been carried to a desired degree of completeness, and utilizing a portion of the circulating wash liquid, after copper has been precipitated therefrom, in the preparation of a leach liquor.

9. In the recovery of copper values by steps comprising a leaching in an acid solution of iron salts, the method which comprises an exhaustive washing by which such salts are formed and an adding of the so-formed salts to a leach liquor.

10. In the recovery of copper values by steps comprising a leaching in an acid solution of iron salts, the method which comprises an exhaustive washing by which such salts are formed and an adding of the so-formed salts to a leach liquor, the mentioned leaching being initiated in the presence of ferric iron amounting to more than 0.5%.

11. In the recovery of copper values by steps comprising a leaching in an acid solution of iron salts, the method which comprises an exhaustive washing by which such salts are formed and an adding of the so-formed salts to a leach liquor, said exhaustive washing for the recovery of copper being followed by an additional washing for the conservation of iron salts.

12. In the recovery of copper values by steps comprising a leaching in an acid solution of iron salts, the method which comprises an exhaustive washing by which such salts are formed and an adding of the so-formed salts to a leach liquor, total copper being finally recovered by an electrolysis.

13. In the recovery of copper values by steps comprising a leaching in an acid solution of iron salts, the method which comprises an exhaustive washing by which such salts are formed and an adding of the so-formed salts to a leach liquor, total copper being finally recovered by an electrolysis conducted under conditions of current density permitting the percentage of ferric iron present to be disregarded.

14. In the recovery of copper values by steps comprising a leaching in an acid solution of iron salts, the method which comprises an exhaustive washing by which such salts are formed and an adding of the so-formed salts to a leach liquor, total copper being finally recovered by an electrolysis conducted under conditions of current density permitting the percentage of ferric iron present to be disregarded and by means of anodes favorable to a desired percentage of ferric iron in a regenerated leach liquor.

15. In the recovery of values by wet methods of treatment from ores or the like the steps which comprise dissolving the values, washing the residues by a counter-current method, thereafter washing the same residues by an exhaustive or circulation method yielding a part of the solvent and employing the resulting liquid in the preparation of additional quantities of solvent.

In testimony whereof I have signed my name to this specification.

GEORGE D. VAN ARSDALE.